Figure 1:
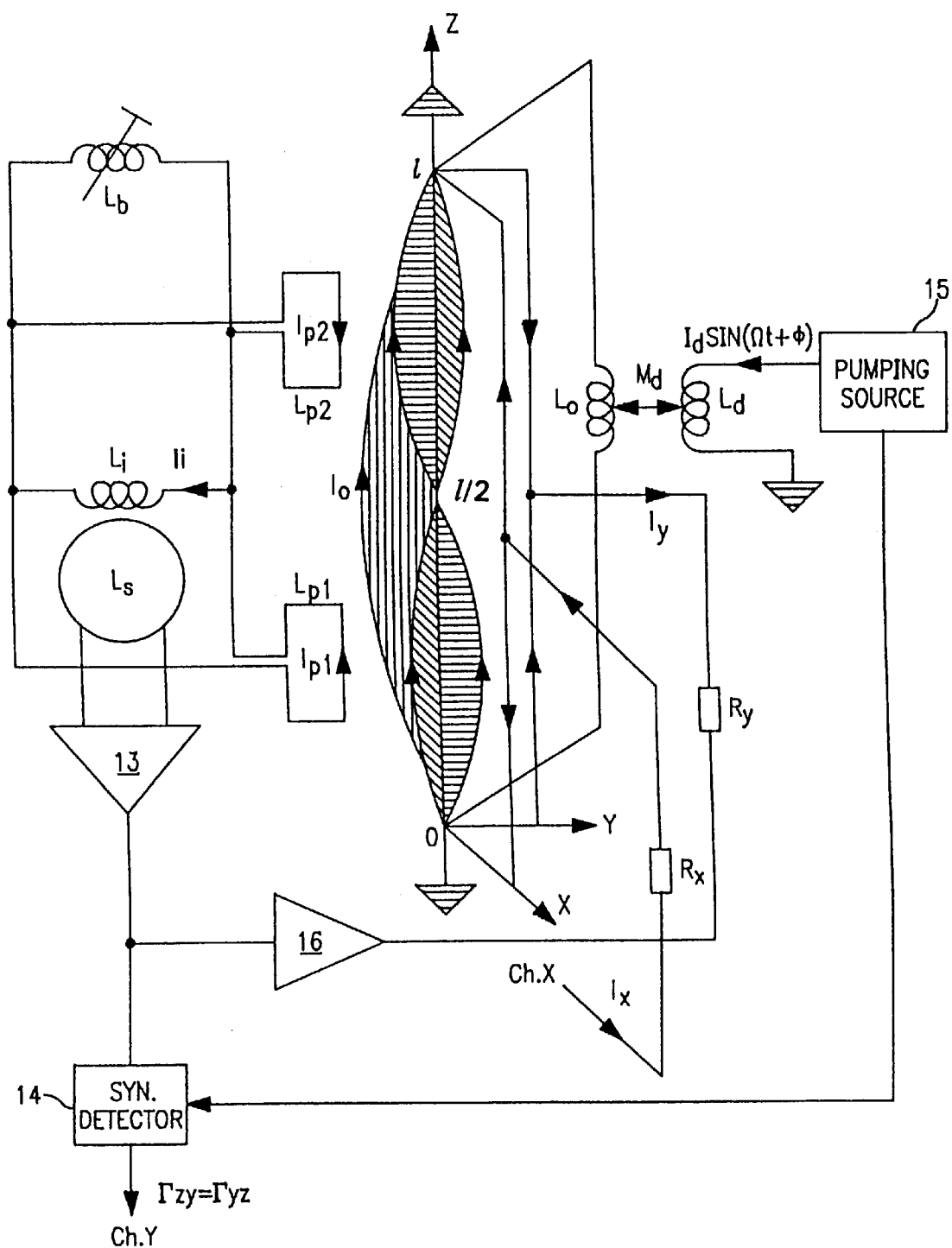

United States Patent [19]
Veryaskin

[11] Patent Number: 5,962,781
[45] Date of Patent: Oct. 5, 1999

[54] APPARATUS FOR THE MEASUREMENT OF GRAVITATIONAL FIELDS

[75] Inventor: Alexey V. Veryaskin, Auckland, New Zealand

[73] Assignee: Gravitec Instruments Limited, St. Peter Port, United Kingdom

[21] Appl. No.: 08/809,914

[22] PCT Filed: Oct. 4, 1995

[86] PCT No.: PCT/GB95/02349

§ 371 Date: Jun. 13, 1997

§ 102(e) Date: Jun. 13, 1997

[87] PCT Pub. No.: WO96/10759

PCT Pub. Date: Apr. 11, 1996

[30] Foreign Application Priority Data

Oct. 4, 1994 [NZ] New Zealand ............................ 264610

[51] Int. Cl.[6] .................................................... G01V 7/00
[52] U.S. Cl. .......................................................... 73/382 G
[58] Field of Search ............................... 73/382 R, 382 G

[56] References Cited

U.S. PATENT DOCUMENTS

| | | | |
|---|---|---|---|
| 2,657,581 | 11/1953 | Fay et al. ................................. | 73/382 R |
| 3,483,753 | 12/1969 | Loeb ....................................... | 73/382 R |
| 3,592,062 | 7/1971 | Mathey .................................... | 73/382 R |
| 4,841,772 | 6/1989 | Paik ........................................ | 73/382 G |

FOREIGN PATENT DOCUMENTS 60-50476 3/1985 Japan .
90/07131 6/1990 WIPO .

OTHER PUBLICATIONS

A. Nicolaidis et al., "String as a Gravitational Antenna," *Il Nuovo Cimento*, vol. 107 B, N.11, Nov. 1992, pp. 1261–1266.

*Primary Examiner*—John E. Chapman
*Attorney, Agent, or Firm*—Alix, Yale & Ristas, LLP

[57] ABSTRACT

Apparatus for measuring gravitational fields comprising a superconducting string (1) fixed at both ends and forming part of a closed superconducting loop inductively coupled to two driving solenoids ($L_{d1}$, $L_{d2}$). Displacement of the string in response to a gravitational field is sensed by two magnetic flux transformers each comprising a signal coil and two pick-up coils (($L_{p1}$, $L_{p2}$). Pairs of pick-up coils lie in two perpendicular planes providing two independent channels of measurements. The two arms of each flux transformer are balanced to convert only the amplitudes of the string's antisymmetric natural modes into an output voltage. The output voltage of each channel is used to produce a feed-back current distribution ($L_{y1}$, $L_{y2}$) proximate and parallel to the string. By adjusting the feed-back current, the effective relaxation time and resonant frequency of the first antisymmetric mode of the string can be adjusted, while leaving the symmetric modes unchanged, thus increasing the apparatus' sensitivity to gravity gradients.

21 Claims, 2 Drawing Sheets

APPARATUS FOR THE MEASUREMENT OF GRAVITATIONAL FIELDS

CROSS-REFERENCE TO RELATED APPLICATIONS

This is the national stage of International Application No. PCT/GB95/02349 filed Oct. 4, 1995.

This invention relates to the measurement of gravitational fields, particularly to gravity gradiometry, and more particularly to a method for measuring absolutely off-diagonal components of the gravity gradient tensor.

The gravity gradient tensor is a two-dimensional matrix of the second partial derivatives of a gravitational potential, V, with respect to the Cartesian co-ordinates, x, y, z, of some arbitrary reference frame. It represents how the gravity vector itself in each of these directions varies along the axes.

Accurate absolute measurements of the components of the gravity gradient tensor $\Gamma_{ij}=\partial^2_{ij}V$ (ij=x,y,z), taken at some local coordinate frame OXYZ are very important to progress in the fields of geological prospecting, mapping of the Earth's gravitational field, and space, sea and underwater navigation.

A method of absolute measurement of gravity gradient tensor components was invented first by Baron Roland von Eötvös as early as 1890, utilising a torsion balance with proof masses hung at different heights from a horizontal beam suspended by a fine filament. The gravity gradients give rise to differential forces being applied to the masses which result in a torque being exerted on the beam, and thus to angular deflection of the masses which can be detected with an appropriate sensor. A sensitivity of about 1 E (1 E=1 Eötvös=$10^{-9}$ s$^{-2}$) can be reached but measurement requires several hours at a single position due to the necessity to recalculate the gravity gradient components from at least 5 independent measurements of an angular deflection each with a different azimuth angle.

Practical devices, which have been built in accordance with this basic principle, are large in size and have low environmental noise immunity, thus requiring specially prepared conditions for measurements which excludes any possibility of using them on a moving carrier.

A method for absolute measurement of gravity gradient tensor components which enhances the above method was invented by Forward in the middle of the sixties (see U.S. Pat. No. 3,722,284 (Forward et al) and U.S. Pat. No. 3,769,840 (Hansen). The method comprises mounting both a dumbbell oscillator and a displacement sensor on a platform which is in uniform horizontal rotation with some frequency $\Omega$ about the axis of the torsional filament. The dumbbell then moves in forced oscillation with double the rotational frequency, whilst many of the error sources and noise sources are modulated at the rotation frequency or not modulated (particularly 1/f noise). The forced oscillation amplitude is at a maximum when the rotation frequency satisfies the resonance condition $2\Omega=\omega_0$, where $\omega_0$ is the angular resonant frequency, and the oscillator quality factor Q tends to infinity. Unlike the non-rotating method, this method enables one to determine rapidly the quantities $\Gamma_{yy}-\Gamma_{xx}$ and $\Gamma_{xy}$ by separating the quadrature components of the response using synchronous detection with a reference signal of frequency $2\Omega$.

The same principles can be directly used, as proposed by Metzger (see U.S. Pat. No. 3,564,921), if one replaces the dumbbell oscillator with two or more single accelerometers properly oriented on such a moving platform. There are no new features of principle in this solution to compare with the previous one except that the outputs of the pairs of accelerometers require additional balancing.

Devices have been built according to this method, but they have met more problems than advantages, principally because of the need to maintain precisely uniform rotation and the small displacement measurement with respect to the rotating frame of reference. The devices have reached a maximum working accuracy of about a few tens of Eötvös for a one second measuring interval, and they are extremely sensitive to environmental vibrational noise due to their relatively low resonant frequencies. The technological problems arising in this case are so difficult to overcome that the existing developed designs of rotating gravity gradiometers are so far only at the stage of prototypes whose measurement accuracy is much lower than the limiting theoretical estimates.

In a paper by A. Nicolaidis and A. Taramopoulos (Il Nuovo Cimento, Vol. 107B, N.11, pages 1261–1266, November 1992), the theoretical motion of a string with fixed ends under the influence of a plane monochromatic time-varying gravitational wave is discussed. According to this document, a string with fixed ends may be excited to resonance provided certain conditions, dependent on the length and orientation of the string and the wavelength of the gravitational wave, are met. It is suggested that Fourier analysis of the motion of the string could be used to extract the direction and energy of the incident wave. The document specifically avoids any discussion of the technical implementation of the theory, but it does suggest that strings a few meters or a few kilometers long should be used for the detection of cosmological radiation or gravitational radiation from a black hole or supernova, as the length of the string should be comparable to the wavelength of the gravitational waves. For the theoretical detector to work requires the gravitational field to oscillate in the form of a gravitational wave, which would not be the case for the gravitational fields associated with massive bodies such as the Earth.

Superconducting gravity gradiometers are known (see U.S. Pat. No. 4,841,772 and Australian patent application 48185/90) utilizing a pair or more of sufficiently separated superconducting accelerometers. Even after greatly reducing the intrinsic and environmental thermal noise factor, using stable persistent super-currents to balance the outputs of the accelerometers, and the most sensitive displacement sensors based on SQUIDs (Superconducting Quantum Interference Devices), they cannot measure the gravity gradient tensor components in their absolute units because they are incapable of fixing a position of the accelerometer's proof mass which is free of all forces. Therefore, only relative displacements of the proof masses can be measured. Rotating designs of such superconducting gravity gradiometers are not known.

Patent Abstracts of Japan vol. 009 No. 117 (P-375) and JP-A-60 050476 disclose a device for measuring the acceleration due to gravity, wherein a weight is suspended from a string. A current passing through the string causes the string to vibrate in the magnetic field of a permanent magnet. An amplified electrical signal corresponding to this vibration is fed back to the string and the string oscillates under self-excitation at a set frequency. The acceleration due to gravity is measured from this frequency.

It is an object of the present invention to provide an apparatus for the measurement of gravitational fields with improved sensitivity, portability and noise immunity over the above known systems.

It is a further object of the present invention to provide a novel apparatus for the absolute measurement of off-diagonal components of the gravity gradient tensor, in which the effect of rotation is replaced by parametric interaction between the sensitive element and active force feed-back connections, whereby enhanced sensitivity and vibrational noise immunity are attained.

It is another object of the present invention to provide a simple technological realisation of the above apparatus utilising the advantages of the standard superconducting techniques which have shown an ability to reach a maximum sensitivity for mechanical displacement measurements and to keep intrinsic noise at a minimum level.

To achieve these objects the present invention provides apparatus for the measurement of quasi-static gravitational fields, comprising: a string held under tension; and output means for producing an output which is a function of the gravitational field, characterised over the disclosure of Patent Abstracts of Japan vol. 009 No. 117 (P-375) and JP-A-60 050476 in that: the string is fixed at both ends; the apparatus comprises sensing means for detecting the transverse displacement of said string from an unperturbated position due to a gravitational field acting on said string; and the output means are responsive to the detected displacement to produce said output which is a function of the gravitational field.

By "string" no particular limitation as to material or construction is intended. Any elongate tension element is included which is capable of being transversely deflected by a gravitational field and of providing a restoring force.

An unperturbated stretched flexible string with fixed ends forms an absolute straight line in space going through the points where the ends of the string are fixed. This line can be identified as one of the axes of the local coordinate frame, say Z, and the other two axes, X and Y, are chosen to lie in the transverse (to the string) plane. Any string deflection from this line is caused by absolute values of the transverse components of the force per unit length which is applied to each unit element of the string.

Viewed from another aspect the invention provides a method of measuring quasi-static gravitational fields, comprising: providing a string held under tension; producing an output, said output being a function of said gravitational field, characterised in that: the string has fixed ends; the method further comprises detecting the transverse displacement of said string from an unperturbated position due to a gravitational field acting on said string; and the output which is a function of the gravitational field is produced in response to the detected displacement.

The string's deflection from its unperturbated position can be easily detected, by any suitable displacement sensing device.

Preferably the string is formed of conductive, most preferably superconductive material. In this case, if an electric current flows through the string, a magnetic field distribution is produced in the transverse plane and along the string's direction. If the string is made of a superconducting material, a maximum current can be carried, and a consequent maximum sensitivity to the deflection can be reached. A d.c. or an a.c. current may be produced in the string by incorporating the string into a current-carrying circuit directly or by an inductive coupling with a pumping circuit (s), provided that the string forms part of a closed conducting or superconducting loop. An a.c. current may be induced in the string, for example by means of one or more, preferably longitudinally symmetrically positioned, coils, which may possibly be superconducting. The use of an a.c. current is advantageous in that it allows synchronous detection of the output signal.

When the string carries a current, the transverse magnetic field around the string may interact with other conductors, or superconductors, by inductive coupling. The amplitude of the current induced in a conductor adjacent the string will be directly related to the distance of the string from that conductor. Thus, in a preferred embodiment of the invention one or more fixed pick-up coils are arranged along the length of the string to act as displacement sensing means, the current induced in each coil being directly related to the string's displacement from its unperturbated position.

In a preferred embodiment of the invention the sensing means comprises at least two sensors, possibly pick-up coils, positioned symmetrically, in the longitudinal direction, with respect to the mid point of the string.

In a particularly advantageous embodiment, displacement sensors, for example pick-up coils, are arranged adjacent the string in two non-parallel preferably orthogonal, planes, so as to be capable of measuring the string's displacement in two transverse directions simultaneously.

It will be understood that the displacement of a string of length 1 from its unpertubated position, for example, in the y-direction of the above local coordinate frame as a function of the z-position of a unit element and time, y(z,t), can be described by the following differential equation $$\eta\frac{\partial^2}{\partial t^2}y(z,\,t)+h\frac{\partial}{\partial t}y(z,\,t)-YA\frac{\Delta l}{l}\frac{\partial^2}{\partial z^2}y(z,\,t)= \quad (1)$$
$$-\eta g_y(0,\,t)-\eta\Gamma_{yz}(0,t)z+\tilde{f}_L(z,\,t)$$

with boundary conditions corresponding to the fixed ends of the string, i.e. y(0,t)=y(1,t)=0. In this equation $\eta$ denotes the string's mass per unit length, h is the friction coefficient per unit length, the parameters Y, A and $\Delta l/1$ are the string's Young modulus, the area of its cross section and the string's strain respectively. The quantities $g_y(0,t)$ and $\Gamma_{yz}(0,t)$ are the absolute values of the y-component of the total acceleration and the corresponding gravity gradient tensor component along the string, both taken at the center of the local coordinate frame chosen. The function $\tilde{f}_L(z,t)$ represents the Langevin random force per unit length acting on the string due to its interaction with the thermostat having the absolute temperature T, with the following correlation function $$\tilde{f}_L(z,t)\tilde{f}_L(z',t')=4k_BTh\delta(z-z')\delta(t-t') \quad (2)$$

where $k_B$=1.4 $10^{-23}$ $JK^{-1}$ is the Boltzmann constant and $\delta(x-x')$ is the delta-function.

In this description, the y-direction has been chosen as an arbitrary example to simplify the explanation of the invention. However, the foregoing and following analysis is equally applicable to any direction transverse to the string or any number of directions.

Applying Fourier analysis to the complex shape of the string caused by its interaction with the gravitational field, the function y(z,t), can be described, in the range z=0 to z=1, by an infinite sum of sinusoidal functions of period 21, with appropriate coefficients $c_y(n,t)$. Thus a solution of Eq.(1), which satisfies the boundary conditions shown above, can be represented by the following sum wherein each term in n corresponds to one of the string's natural vibrational modes $$y(z, t) = \sum_{n=1}^{\infty} c_y(n, t) \sin\left(\frac{\pi n}{l} z\right) \quad (3)$$

By substituting Eq.(3) into Eq.(1) and by multiplying its left-hand and right-hand sides by $\sin(\pi n'z/1)$, and then by integrating both sides over z from 0 to 1, one can obtain the differential equation for $c_y(n,t)$ $$\frac{d^2}{dt^2} c_y(n, t) + \frac{2}{\tau} \frac{d}{dt} c_y(n, t) + \omega_n^2 c_y(n, t) = \quad (4)$$

$$\frac{2}{\pi n}[(-1)^n - 1]g_y(0, t) + (-1)^n \frac{2l}{\pi n} \Gamma_{yz}(0, t) + \frac{2}{\eta l} \int_0^l dz \tilde{f}_L(z, t) \sin\left(\frac{\pi n}{l} z\right)$$

where the quantities $$\omega_n = \frac{\pi n}{l} \sqrt{\frac{Y}{\rho} \frac{\Delta l}{l}} \quad (5)$$

represent the string's natural frequencies; τ and ρ are the relaxation time and the volume mass density of the string respectively.

When n takes an even value, i.e. for those terms of the infinite sum in Eq. 3 corresponding to vibrational modes of the string having a node at $z=\frac{1}{2}$ (antisymmetric modes), the term involving $g_y(0, t)$ is equal to zero. Thus, for n even, $c_y$ is dependent only on $\Gamma_{yz}$ (and thermal noise).

In practice this means that the amplitude, $c_y$, of the antisymmetric sinusoidal components of the deflection of the string in the y-direction, y(z,t), is dependent only on the magnitude of the gravity gradient tensor component $\Gamma_{yz}$.

The mid point of the string, $z=\frac{1}{2}$, is the position of a node in all antisymmetric vibrational modes of the string. If sensors are positioned symmetrically in the longitudinal direction with respect to this point, it will be possible to identify displacements of the string corresponding to the string's natural antisymmetric vibrational modes while discounting displacements corresponding to symmetric modes, the magnitude of which is not only affected by the gravity gradient tensor component $\Gamma_{yz}$ but also the absolute acceleration due to gravity in the y-direction, $g_y$.

It is particularly advantageous if displacement sensors are positioned at $z=\frac{1}{4}$ and $z=3\frac{1}{4}$, positions corresponding to the antinodes of the first antisymmetric vibrational mode of the string, n=2. At these points the displacement of the string corresponding to the n=2 mode is at a maximum and thus the sensing signal will also be at a maximum, giving optimum sensitivity.

According to a further development of the invention a conductor may be provided adjacent the conductive string. The conductor may carry a current directly related to the output of the sensing means, by the use of a positive feedback loop. The current may be activated continuously or periodically, for example in an "off-on" manner. In this case, a small deflection of the string due to a gravitational field will be amplified by the magnetic interaction of the string and conductor. In other words, the conductor will "push" (or "pull") the string into further deflection in direct response to a small deflection caused by a gravitational field acting on the string. This is clearly advantageous in that the displacement of the string is greater by virtue of the magnetic interaction with the conductor and is therefore more readily measurable, improving the sensitivity of the apparatus.

In a particularly advantageous embodiment of this development, two or more conductors, possibly superconductors, are positioned longitudinally symmetrically about the mid-point of the string so that they amplify the antisymmetric modes of the string.

In overview, a preferred embodiment of the invention provides a novel apparatus for measuring absolutely and simultaneously a pair of off-diagonal components of the gravity gradient tensor by means of a flexible superconducting current-carrying string with fixed ends, comprising active parametric force feed-back connections. The string is the coherent sensitive element whose symmetric natural transverse modes are caused by the total acceleration in the transverse plane, whilst the antisymmetric modes are caused only by absolute values of the gravity gradient components along the string's direction.

In this embodiment the string forms a low-inductance part of a closed superconducting loop which is inductively coupled to a high-inductance driving solenoid(s) carrying an a.c. reference current from an external pumping source with some frequency Ω. The string is also inductively coupled to two superconducting magnetic flux transformers each comprising a signal coil and two pick-up coils wherein the pairs of pick-up coils lie in two perpendicular planes the cross-line of which coincides with the unperturbated string, thus forming two independent channels of measurements. The two arms of each superconducting flux transformer are balanced to convert only the string's antisymmetric natural modes into signal current in the signal coil to be measured with SQUID's (Superconducting Quantum Interference Devices) electronics. The output voltage of each channel, deeply modulated with the frequency Ω, is then proportional to the amplitudes of the antisymmetric natural modes of the string. This voltage is passed through a differentiating and summing amplifier, and then used to load the feed-back circuit to produce an in-line feed-back current distribution proximate and parallel to the string. By adjusting the feed-back current, the effective relaxation time and the resonant frequency of the first antisymmetric natural mode of the string (whose amplitude depends only upon the gravity gradient along the string's direction) can be increased and decreased respectively, while the same parameters for the symmetric natural modes (whose amplitudes depend upon the total acceleration in the transverse-to-string plane) are not changed. In use, the feed-back circuit shifts the Brownian and vibrational noise level to far below the sensitivity required for industrial applications.

Figure 2:
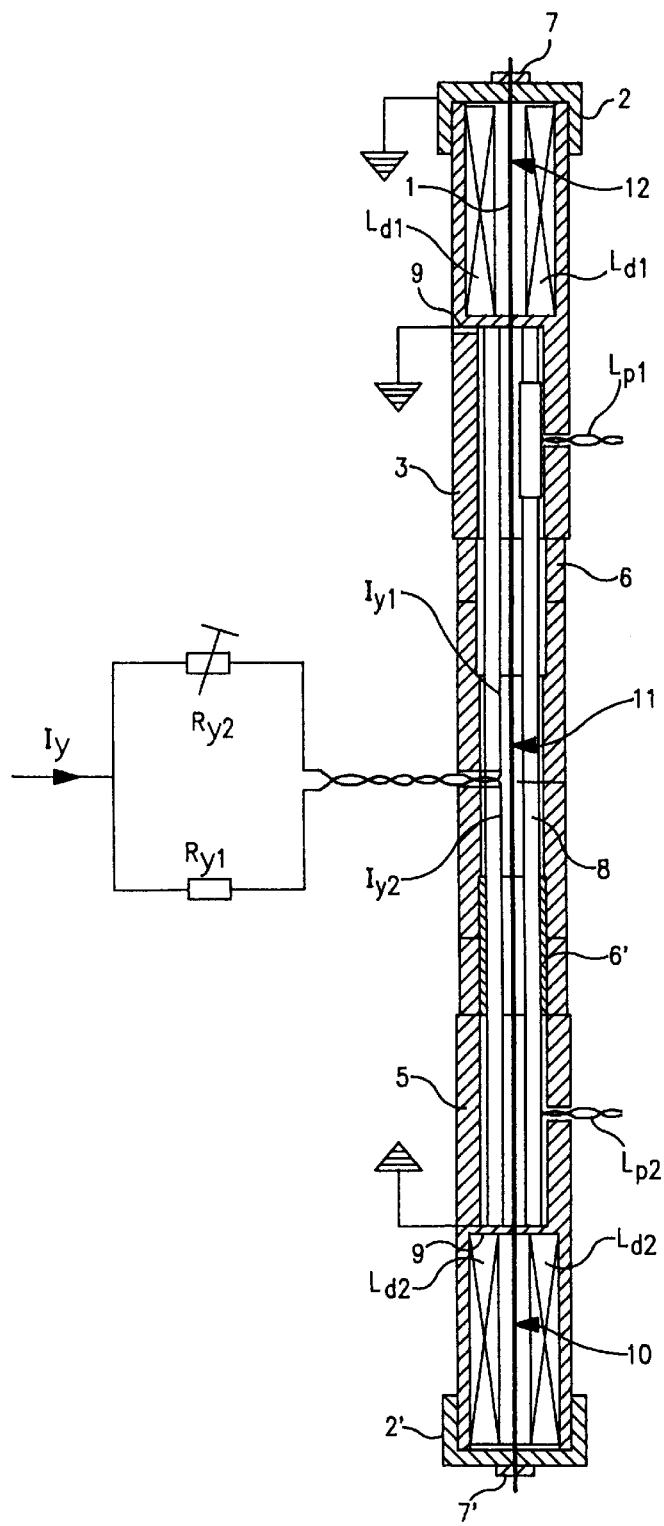

A preferred embodiment of the invention will now be described by way of example only and with reference to the following drawings in which:

FIG. 1 is a general schematic representation of a preferred embodiment of the invention; and FIG. 2 is a diagrammatic vertical cross-section of a device according to a preferred embodiment of the invention.

A single channel prototype of a device according to the invention (see FIG. 2) has a flexible string 1. The string is preferably formed of a superconducting material such as Niobium (Nb). Niobium wire is the best choice, having optimum elastic properties, which have been proven to be usable at 4.2 K. The string forms the low-inductance part $L_o$ of a superconducting closed loop which is inductively coupled to high-inductance driving solenoid(s) $L_d$ carrying an a.c. reference current $I_d(t)$ from an external pumping source with some frequency Ω. The rest of the loop is provided by the casing of the device 2,2',3,4,5.

The string has, in this embodiment, a length l=24 cm, is 1 mm in diameter and is fixed at its ends by two Nb cups 2,2' of cylindrical shape each having a hole of 1 mm diameter at its centre. The cups 2,2' close tightly the ends of a Nb cylinder comprising three parts 3,4,5 connected together with two Nb cylindrical rings 6,6' carrying a fine thread. The parts 3 and 5 also carry threads to engage other elements of the construction. The string's tension is produced by two Nb nuts 7,7' of 1 mm fine thread.

The whole construction forms a closed superconducting cylindrical cavity with the string axially positioned. There are three spaces 10, 11, 12 inside this volume electromagnetically insulated as much as possible from each other by Nb partitions 9. In two of them 10, 12, driving toroidal solenoids $L_{d2}$ and $L_{d2}$, wound with 0.01 mm Nb wire and connected in series, are placed, thus forming a large mutual inductance $M_d$ between $L_d = L_{d1} + L_{d2}$ and the inductance of the cylindrical cavity $L_o$ which is of the order $10^{-7}$H for the sizes chosen. The ratio $M_d/L_o$ is about $5 \times 10^2$, so if the a.c. pumping current $I_d(t)$ in the driving solenoids has an amplitude of about 100 mA then the induced a.c. supercurrent $I_o$ carried by the string is about 50 A peak to peak. In this case, the corresponding circular component of the magnetic induction B at the string's surface is nearly 200 Gauss which is approximately four times smaller than the Niobium first critical field $B_{c1}$.

The two rectangular-type pick-up coils $L_{p1}$ and $L_{p2}$ of the superconducting flux transformer, and the active force feed-back circuit are mounted together on a Titanium tube 8 placed inside the central space of the construction shown in FIG. 2. Titanium is chosen because it has a thermal expansion coefficient matching that of Niobium. The active force feed-back circuit comprises two arms of 0.5 mm insulated copper wire stretched parallel to the string and carrying the feed-back current $I_y = I_{y1} + I_{y2}$.

This design has particular advantages; for instance, the closed superconducting configuration gives optimum shielding against external varying electromagnetic fields. Also, the cylindrically symmetric configuration has a small radial size which, including all integral parts of the prototype, is no more than 3.8 cm diameter. Thus, it is possible to utilize a standard commercial 100 liter liquid helium vessel having an input opening of about 4 cm diameter to cool the construction down with a standard probe. Special helium cryostats, which have been used for known devices, exclude the possibility of removing the device from the cryostat's inner volume, for example if something goes wrong, to readjust it under field conditions. Removal of a device from a cryostat requires a long period, of for example several hours, to warm the cryostat contents to atmospheric temperature so that the contents do not explode under rapid thermal expansion. This is one of the major disadvantages of known constructions. However, the small input opening of the standard commercial 100 liter liquid helium vessel prevents such an explosion occurring, which means that the apparatus according to the present invention can be removed from the vessel and adjusted under field conditions.

The string is deflected by a non-uniform quasi-static gravitational field and interacts with a variable feed-back current distributed close to and substantially parallel to the string. The distribution is optimum when the feed-back current is injected at or taken from the point in the feed-back circuit opposite the mid-point of the string (see FIG. 1). In the local coordinate frame chosen this point is z=½. Another requirement for optimum operation is that the two arms of the feed-back circuit are substantially equal and grounded at their ends. In this case, there is no electromagnetic coupling between the feed-back current and the closed superconducting loop in which the string is incorporated.

The current $I_o(t)$ flowing through the string and interacting with the feed-back current distribution $I_y(z,t)$ gives rise to the following transverse component of the force per-unit-length $f_y(z,t)$ acting on the string $$f_y(z, t) = \pm \frac{\mu_0}{2\pi d} I_0 I_y(z, t) \sin(\Omega t) \quad (6)$$

where $\mu_0 = 4\pi \ 10^{-7}$ Hm$^{-1}$ is the magnetic vacuum permeability, d is the distance between the center of the unperturbated string and the center of the wire carrying the feed-back current and the phase of the pumping current source 15 is chosen to be zero. The sign + or − is determined by the output buffer of the differentiating and summing amplifier 16 shown in FIG. 1. The transverse motion of the unit element of the string in the OYZ plane is then described by the following differential equation $$\eta \frac{\partial^2}{\partial t^2} y(z, t) + h \frac{\partial}{\partial t} y(z, t) - Y_{Nb} A \frac{\Delta l}{l} \frac{\partial^2}{\partial z^2} y(z, t) = \quad (7)$$

$$-\eta g_y(0, t) - \eta \Gamma_{yz}(0, t) z \pm \frac{\mu_0}{2\pi d} I_0 I_y(t) \sin(\Omega t) + \tilde{f}_L(z, t)$$

which will be seen to correspond to Eq.(1) with the addition of the term of Eq.(6). Consequently, Eq.(7) also has solutions of the form of Eq.(3). Thus, following the same algebraic manipulation as for Eq.(1), a differential equation for $c_y(n,t)$ can be obtained for this embodiment. This is Eq.(8) which corresponds to Eq.(4) but with the addition of a feedback term.

$$\frac{d^2}{dt^2} c_y(n, t) + \frac{2}{\tau} \frac{d}{dt} c_y(n, t) + \omega_n^2 c_y(n, t) = \quad (8)$$

$$\frac{2}{\pi n}[(-1)^n - 1]g_y(0, t) + (-1)^n \frac{2l}{\pi n} \Gamma_{yz}(0, t) \pm$$

$$\frac{1}{\eta} \frac{\mu_0}{2\pi^2 d} \epsilon_n I_0 I_y(z, t) \sin(\Omega t) + \frac{2}{\eta l} \int_0^l dz \tilde{f}_L(z, t) \sin\left(\frac{\pi n}{l} z\right)$$

The quantity $\epsilon_n$ relates to the characteristics of the transducer system of the feedback loop; the longer the length of the arms of the feedback circuit, the larger the quantities $\epsilon_n$ are. If the arms of the feed-back circuit are absolutely identical then the quantities $\epsilon_n$ are equal to zero for all odd n=1,3,5 . . . Their particular values for the sizes shown in FIG. 2 are determined by $$\epsilon_n = \frac{1}{n}\left[\cos\left(\frac{\pi n}{6}\right) + \cos\left(\frac{5\pi n}{6}\right) - 2\cos\left(\frac{\pi n}{2}\right)\right] \quad (9)$$

So, for the properly adjusted feed-back circuit, only the antisymmetric natural modes of the string interact with the feed-back current. However, only the antisymmetric natural modes of the string are sensitive to the absolute value of the gravity gradient tensor component to be measured, as is seen from Eq.(4) and (7).

The superconducting pick-up coils $L_{p1}$ and $L_{p2}$ are placed near the string and cause two arms of the superconducting magnetic flux transformer to convert, if perfectly balanced, only the antisymmetric natural modes into the signal current $I_i$ to be detected with the SQUID's electronics 13 (see FIG. 1). One uses SQUID's (Superconducting Quantum Interference Devices) 13 as they are the most sensitive variable current and magnetic flux sensors currently available. In the prototype shown in FIG. 2, the pick-up coils are made in the form of two rectangular-type single loops of Nb wire placed symmetrically with respect to the midpoint of the string and connected in parallel with the signal coil $L_i$. If the symmetry is perfect and the areas of the loops are absolutely identical, then the symmetric natural modes do not produce any signal current $I_t$ or feed-back current $I_y$. The same effect can be achieved for slightly non-identical pick-up coils with the accuracy required, if one uses the additional inductance(s) $L_b$ connected in parallel and/or series with one or both of the pick-up coils. The inductance(s) $L_b$ can be tuned to balance the two arms of the superconducting flux transformer. The residual "zero-model" current in the signal coil $L_i$ corresponding to the unperturbated position of the string can be compensated directly inside the SQUID by an additional coupling (not shown) to the pumping current source. If the balancing conditions are satisfied, then the output voltage of the SQUID's electronics 13 is determined by $$V_y(t) = KI_0 L_s \sin(\Omega t)\left(\sum_{n=1}^{\infty} \beta_n c_y(n,t)\right) + K\tilde{\Phi}_N(t) \quad (10)$$

where K is the total flux to voltage transfer function and $L_s$ is the SQUID's inductance. The quantities $\beta_n$ depend on the physical design and position of the pick-up coils and are equal to zero if n=1,3,5 .... The function $\Phi_N(t)$ is the equivalent-to-noise random magnetic flux inside the SQUID loop, whose spectral density $S_\Phi(\Omega)$ determines the intrinsic instrumental limit of the accuracy of measurements. The feed-back current $I_y(t)$ is formed from the output voltage $V_y(t)$ by passing it through a differentiating and summing amplifier 16 which is loaded by resistance $R_y$. In this case, the feed-back current $I_y(t)$ can be represented by $$I_y(t) = \frac{p\tau^*}{R_y}\frac{d}{dt}V_y(t) + \frac{q}{R_y}V_y(t) \quad (11)$$

where p, q and $\tau^*$ are constant parameters which depend upon the design of the differentiating and summing amplifier 16.

It must be noted that a mismatch between the two arms of the feed-back circuit always exists. The design shown in FIG. 2 uses two identical feed-back resistances, $R_{y1}$ and $R_{y2}$, one for each arm. In this case the mismatching can be easily compensated by tuning one of the resistances, say $R_{y2}$, to obtain the optimum case.

Equations (7) and (11) represent a closed infinite set ii of differential parametric-type equations. Careful analysis has shown that we can ignore the terms involving the quantities $c_y(n,t)$ with n>2 in the right-hand side of Eq.(11). The reason is that just one mode can be made "soft" i.e. the most sensitive to the gravity gradient, namely $c_y(2,t)$. If the string's natural frequencies are high enough and separated by single octave gaps, only second-order corrections are required which can be easily taken into account along with analysis of other instrumental errors. Then, as follows from Eq. (7), the self-consistent equation for the gravity gradient sensitive mode, n=2, including unavoidable fundamental noise sources can in turn be written in the form $$\frac{d^2}{dt^2}c_y(2,t) + \left(\frac{2}{\tau} - \frac{1}{2}\alpha + \frac{1}{2}\alpha\cos(2\Omega t)\right)\frac{d}{dt}c_y(2,t) + \quad (12)$$

$$\left(\omega_2^2 - \frac{1}{2}\bar{\omega}^2 + \frac{1}{2}\bar{\omega}^2\cos(2\Omega t) - \frac{1}{2}\alpha\Omega\sin(2\Omega t)\right)c_y(2,t) =$$

$$\frac{l}{\pi}\Gamma_{yz}(0,t) + \frac{2}{\eta l}\int_0^l dz \tilde{f}_L(z,t)\sin\left(\frac{2\pi}{l}z\right) + \text{(back-action noise)}\sin(\Omega t)$$

where $$\bar{\omega}^2 = |\epsilon_2 \beta_2 qK| \frac{1}{\eta}\frac{\mu_0 I_0^2}{2\pi^2 d}\frac{L_s}{R_y} \quad \alpha = \bar{\omega}^2 \left|\frac{p}{q}\right|\tau^* \quad (13)$$

and it is assumed that the true sign of the feed-back current has been chosen.

If some easily carried out conditions are satisfied, which are $$\frac{1}{\Gamma}\frac{d\Gamma}{dt} \ll \sqrt{\omega_2^2 - \frac{1}{2}\bar{\omega}^2} \quad 8\Omega^2 \gg \omega_2^2 \quad \frac{2}{\Omega\tau} \ll 1 \quad (14)$$

then one can show that the self-consistent output voltage is $$V_y(t) \cong \beta_2 KI_0 L_s \left(\frac{l}{\pi}\frac{\Gamma_{yz}(0,t)}{\omega_2^2 - \frac{1}{2}\bar{\omega}^2} + \text{brownian noise}\right)\sin(\Omega t) + K\tilde{\Phi}_N(t) \quad (15)$$

where under "brownian noise" the combination of thermal and back-action noises is implied.

It is of interest to estimate the limiting accuracy of measurements of this embodiment of the invention, which can be represented by the value of a minimum detectable gravity gradient $$\Gamma_{min} = \frac{\pi}{l}\sqrt{\frac{16k_B T}{m\tau_{eff}} + \frac{\bar{\omega}^4}{2\beta_2^2}\frac{E_\Phi(\Omega)}{L_s I_0^2}} \; 10^9 \; \frac{\text{Eötvös}}{\sqrt{\text{Hz}}} \quad (16)$$

where $\tau_{eff}=\tau/(1-\alpha\tau/4)$ is the effective relaxation time, m is the total mass of the string, and $E_\Phi(\Omega)$ is the energy resolution of the SQUID. Using the following practical parameters: l=0.24 m, m≅1.6 $10^{-3}$ kg, $\tau_{eff}$≅$10^4$ s, $\beta_2$≅$4\times10^3$ $m^{-1}$, $L_s$≅$5\times10^{-11}$H, $I_o$≅50 A, $(\omega_2^2-\bar{\omega}^2/2)^{1/2}/2\pi$≅2 Hz, $\omega_2/2\pi$≅40 Hz, $\Omega/2\pi \geq 2\times10^2$ Hz, $E_\Phi(\Omega)$≅$2\times10^{-31}$ J/Hz (d.c. biased SQUID), one can obtain from Eq.(16)

$$\Gamma_{min} \cong 0.4 \; \frac{\text{Eötvös}}{\sqrt{\text{Hz}}} \quad (17)$$

It can be shown, that a range of the parameters $\tau$, $\omega_2$, $\omega$, $\alpha$ and $\Omega$ exists where the string's response described by Eq. 12 is stable. For example, for quasistatic gravity gradients and sufficiently high pumping frequency $\Omega$ one can ignore the oscillating terms containing Cos(2$\Omega$t) and Sin(2$\Omega$t) in the right side of Eq. 12.

There are a number of detecting strategies which can be employed by the present invention at this stage, which are dependent on the initial mechanical parameters of the string and the application for which the apparatus is intended. It is preferable to use a string with a high mechanical stiffness and a short relaxation time in order to increase immunity to vibrational noise, which is the main noise source in industrial applications, particularly in mobile gravity gradiometry. On the other hand, the stiffer the string, the stronger the feedback force that has to be applied to the string to soften the signal mode, and the larger the back-action noise associated with the feedback current.

Additionally, the shorter the string's relaxation time, the stronger the influence of thermal fluctuations of the string on the measuring accuracy since the mass per unit length of the string will normally be quite small.

To overcome both of these problems a best mode of carrying out gravity gradient measurements according to another embodiment of the present invention uses variable feedbacks in an "off-on" manner. In this case, the feedback force is initially not applied to the string for an 'off-period' during which the string reaches thermodynamic equilibrium. The feedback force is then quickly activated for an 'on-period' during which the effective natural frequency $$\omega_{eff} = \sqrt{\omega_2^2 - \frac{1}{2}\overline{\omega}^2} \qquad (18)$$

and the effective relaxation time $$\tau_{eff} = \tau\left(1 - \frac{\alpha\tau}{4}\right)^{-1} \qquad (19)$$

become substantially smaller and longer respectively compared to the corresponding initial parameters of the string. The feedback is adjusted in such a way that the effective relaxation time becomes much longer than the on-period. Measurements are carried out during the on-period only, in which the string never reaches thermodynamic equilibrium. For example, the fluctuation dissipation theorem is no longer applicable to the string during the period of measurements and its response to all external noise sources is changed (see V. B. Braginsky and A. B. Manukin, Measurement of Weak Forces in Physics Experiments, Ed. by D. H. Douglass, University Press of Chicago, 1977).

One can show that in this case the least gravity gradient detectable by this embodiment of the invention can be represented by $$\Gamma_{min} \cong \frac{\pi}{l}\sqrt{\gamma(\delta)\frac{16k_BT}{m\tau\tau_m} + \frac{\overline{\omega}^4}{2\beta_2^2}\frac{E_\Phi(\Omega)}{L_s I_0^2 \tau_{eff}}\log\left(\frac{1}{\delta}\right)} \; 10^9 \text{ Eötvös} \qquad (20)$$

where $$\gamma(\delta) = \frac{4\tau\tau_m}{\tau_{eff}^2}\log\left(\frac{1}{\delta}\right) + \frac{\omega_{eff}^4}{\omega_2^4}\left[\frac{1}{\delta} + \log\left(\frac{1}{\delta}\right)\right] \qquad (21)$$

$\tau_m$ is the measurement time (on-period), m is the total mass of the string, $E_\Phi(\Omega)$ is the energy resolution of the SQUID at the frequency $\Omega$ and $\delta$ is a statistical error of the first kind. The value of $\delta$ is the likelihood that the equivalent gravity gradient noise will exceed the value represented by the left side of Eq. 20 for the period of measurement.

Using the following practical parameters: l=0.24 m, M=1.6×10$^{-3}$ kg, τ=0.5 s, $\tau_m$=1 s, $\tau_{eff}$≅10$^4$ s, $\beta_2$≅4×10$^3$ m$^{-1}$, $L_S$≅5×10$^{-11}$H, $I_o$≅50 A, $\omega_{eff}$/2π≅3 Hz, $\omega_2$/2π≅80 Hz, Ω/2π≧10$^4$ Hz, $E_\Phi(\Omega)$≅5×10$^{-32}$ J/Hz (500 d.c. biased SQUID), one can obtain from Eq.(20)

$\Gamma_{min}$=0.02 Eötvös

In both the above embodiments, the desired signal is obtained from the output voltage by synchronous detection with a reference signal taken from the pumping source 15, and the invention allows calibration of the desired signal in gravity gradient absolute units without rotation as has been proposed for known rotating gravity gradiometers. As for rotating designs, the invention allows the movement of the noise spectrum to a frequency range at which 1/f contribution is sufficiently small. Natural vibrations of the string, which occur during the time of measurement (on-period), do not cause a problem since they can be filtered out from the desired signal provided that the on-period is chosen to be much longer than the period (2π/$\omega_{eff}$) of such vibrations.

Vibrational noise immunity is improved by the factor ($\omega_{eff}$/$\omega_1$)$^2$ which can be made as small as 10$^{-2}$.

One must consider inductive cross-coupling between the feedback currents and each pair of the pick-up coils and cross-coupling between the pick-up coils themselves, both of which act like negative feedback loops. On the one hand this leads to unnecessary renormalisation of the amplitudes of the output signals until the gain of the SQUID's electronics exceeds some critical value. On the other hand in the case of double-channel measurements, the output signal of each channel contains a linear combination of each gravity gradient component to be measured. It can be shown that each of such components can, nevertheless, be measured separately and simultaneously, if a proper data acquisition system is used. The effect can be easily eliminated by organising additional positive feedback to counteract this negative feedback, for example by connecting, via a weak inductive coupling, each feedback current with each SQUID.

In practice, the apparatus according to the invention can be used to determine in absolute units the off-diagonal components of the gravity gradient. By conducting a gravity survey over an area, small differences in absolute gravity gradient can be detected. Such small changes may indicate variations in local geological features, for example, the presence of minerals, gas or oil.

Repeated readings over time at a single locality could indicate changing geological status of an area, such as rising magma. Clearly the invention enhances prospecting and other data gathering pursuits where accurate gravitational field measurement is required. Use of absolute values enhances the information that can be determined from the data measured. A gradiometer according to the invention can be used while moving, which allows the gradiometer to be used on vehicles whether land, sea or air vehicles. For example, the device can be suspended from a helicopter and used while the helicopter traverses a selected area.

I claim:

1. Apparatus for the measurement of quasi-static gravitational fields, comprising:

a string composed of conductive material, fixed at both ends, held under tension and arranged to carry a current $I_o$;

sensing means for detecting the transverse displacement of said string from an unperturbated position due to a gravitational field acting on said string; and means responsive to the detected displacement for producing an output which is a function of the gravitational field.

2. Apparatus as claimed in claim 1, wherein said sensing means comprises at least two sensors symmetrically longitudinally positioned about the mid-point of said string.

3. Apparatus as claimed in claim 1 further comprising conductive means adjacent said string carrying a current $I_y$, wherein the magnitude of the current $I_y$ is a function of the output of the sensing means; and the magnetic fields associated with the current $I_y$ through the conductive means and the current $I_o$ through the string interact to produce a feedback force on said string so as to increase the transverse displacement of the string from its unperturbated position in response to the gravitational field acting on said string.

4. Apparatus as claimed in claim 3, wherein said conductive means comprises at least two conductors longitudinally symmetrically positioned about the mid-point of said string, each conductor carrying a substantially equal proportion of said current $I_y$.

5. Apparatus as claimed in claim 3 wherein the current $I_y$ through said conductive means is activated periodically.

6. Apparatus as claimed in claim 1, wherein said sensing means comprises at least one pick-up coil in which a current $I_p$ is induced by said current $I_o$ through said string, said current $I_p$ being a function of said string's displacement.

7. Apparatus as claimed in claim 1, wherein said current $I_o$ through said string is an alternating current.

8. Apparatus as claimed in claim 1 wherein said current $I_o$ is induced in said string by inductive means.

9. Apparatus as claimed in claim 8, wherein said inductive means comprises two solenoids longitudinally symmetrically positioned about the mid-point of said string.

10. Apparatus as claimed in claim 1, wherein said string is composed of superconducting material.

11. Apparatus as claimed in claim 1, wherein said sensing means comprises means for detecting the transverse displacement of said string in two non-parallel planes.

12. A method of measuring quasi-static gravitational fields, comprising:

providing a string composed of conductive material with fixed ends and held under tension;

passing a current through said string;

detecting the transverse displacement of said string from an unperturbated position due to a gravitational field acting on said string; and producing an output in response to the detected displacement, said output being a function of said gravitational field.

13. A method as claimed in claim 12 wherein said output is produced by measuring the spatial position of at least one point on the string relative to the unperturbated position of said point.

14. A method as claimed in claim 13 wherein the spatial positions of an even plurality of points on the string are measured relative to their unperturbated positions and said points are chosen to lie pair-wise longitudinally symmetrically about the mid-point of the string.

15. A method as claimed in claim 14 wherein said points correspond to the positions of antinodes of the antisymmetric natural modes of said string.

16. A method as claimed in claim 12 wherein said displacement of said string is increased by applying a feedback force to the string, said force being a function of the gravitational field acting on the string.

17. A method as claimed in claim 16 wherein said feedback force is a direct function of said output.

18. A method as claimed in claim 17 wherein said feedback force is applied to said string so as to accentuate the components of the spatial configuration of the string corresponding to natural antisymmetric modes of the string in preference to the components of the spatial configuration corresponding to natural symmetric modes.

19. A method as claimed in claim 12 wherein said displacement is measured in two non-parallel planes.

20. A method of measuring absolute off-diagonal components of the gravity gradient tensor, the method comprising the steps of:

providing a flexible string with fixed ends;

applying a force per-unit-length to said string;

detecting the deflection of said string from its unperturbated position due to absolute values of transverse-to-string components of said force per-unit-length applied to each unit element of said string; and analyzing the detected deflection, wherein said deflection is a combination of said string's natural modes, and the even said modes are caused only by absolute values of the components of the gravity gradient in the string's direction, whilst the odd said modes are caused by total acceleration in the transverse-to-string plane.

21. Apparatus for measuring off-diagonal components of the gravity gradient tensor of quasi-static gravitational fields comprising:

a string held under tension, said string being fixed at both ends;

means for applying a force per-unit-length to said string;

sensing means for detecting the transverse displacement of said string from an unperturbated position due to a gravitational field acting on said string; and output means responsive to the detected displacement for producing an output which is a function of the gravitational field, wherein deflection of said string is caused by absolute values of transverse-to-string components of said force acting on said string, in a manner such that deflection of said string is a combination of said string's natural modes, and the even said modes are caused only by absolute values of the components of the gravitational gradient in the string direction, while the odd said modes are caused by total acceleration in the transverse-to-string plane.

\* \* \* \* \*